United States Patent Office 2,908,702
Patented Oct. 13, 1959

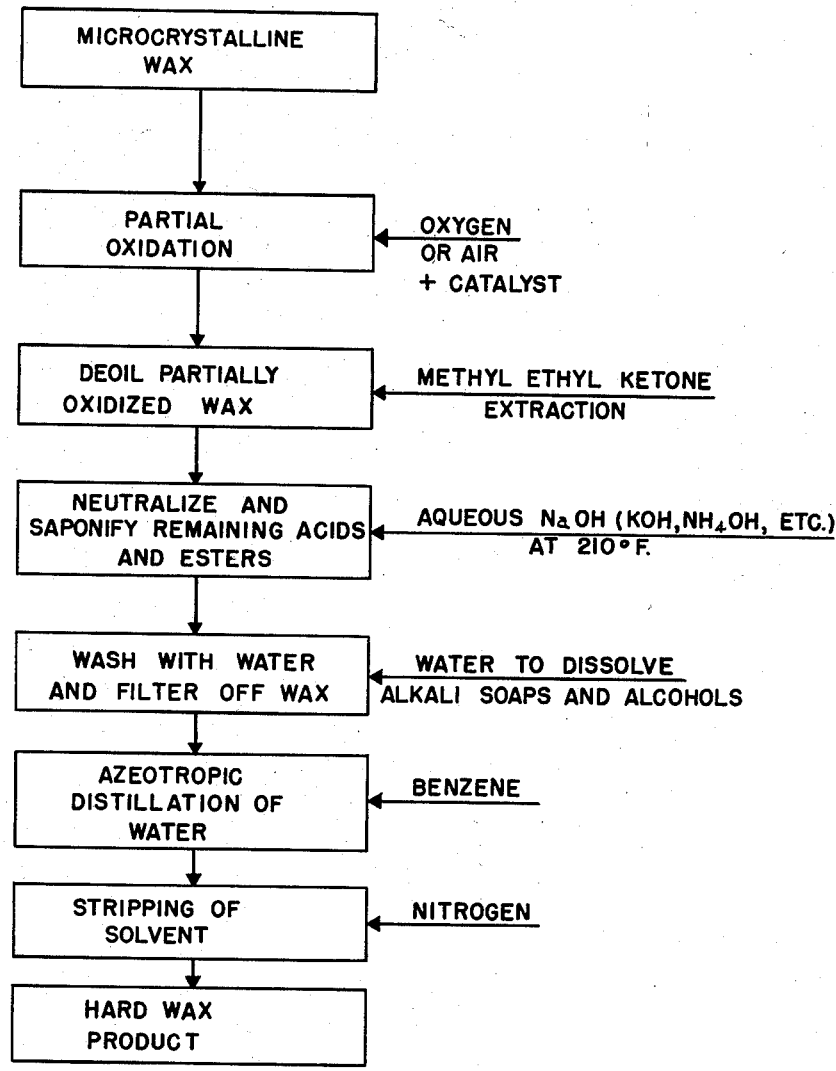

2,908,702

PROCESS FOR THE PREPARATION OF OXIDIZED MICROCRYSTALLINE WAXES OF INCREASED HARDNESS

Robert M. Haines and John W. Walsh, Crystal Lake, Ill., assignors to The Pure Oil Company, Chicago, Ill., a corporation of Ohio Application July 30, 1957, Serial No. 675,180

7 Claims. (Cl. 260—452)

This invention relates to new and useful improvements in processes for the preparation of hard, oxidized, microcrystalline waxes.

In particular, this invention relates to a process (and the product of said process) in which a microcrystalline wax of very low oil content is partially oxidized in the liquid phase, using oxygen or air and a suitable oxidation catalyst. The oxidized wax mixture is then subjected to extraction with a suitable deoiling solvent, such as methylethyl ketone or a mixture of methylethyl ketone and toluene, to remove most of the acidic and ester oxidation products. The deoiled wax mixture is then saponified with aqueous alkali containing enough water to dissolve the alkali soaps and alcohols which are formed. The wax is then separated from the soap solution, washed with water, and filtered. The wax is dried by any suitable process, such as azeotropic distillation with benzene, followed by nitrogen stripping. The final wax product produced in this process is a very hard wax having a very low A.S.T.M. penetration.

In Patent 2,794,040, in which one of the present applicants is a joint inventor, the nature of microcrystalline waxes is discussed at length and the problems of preparing satisfactory oxidized microcrystalline waxes are reviewed. In that patent there is described a process for preparing hard, oxidized, microcrystalline waxes by partial oxidation, followed by deoiling with methylethyl ketone or a mixture of methylethyl ketone and toluene. That process, however, is subject to the disadvantage that all of the oxidation products are not removed in the deoiling or solvent-extraction step, which results in a product which may contain some oxidized impurities having objectionable odors.

It is therefore one subject of this invention to provide a new and improved process for the treatment of oxidized and deoiled microcrystalline waxes to remove residual oxidation products and produce an odor-free wax of greater hardness.

A feature of this invention is the provision of a process in which an oxidized and deoiled microcrystalline wax is treated with aqueous alkali to saponify residual acids and esters and filtered and dried to produce a wax which is free of odor and very hard.

Other objects and features of this invention will become apparent from time to time throughout the specification and claims as hereinafter related.

In the accompanying drawing there is shown a flow diagram of this process.

In our process a petroleum microcrystalline wax having an oil content less than about 0.7% by weight is used as a starting material in the manner described in Patent 2,794,040. This wax is melted and subjected to partial oxidation, to an neutralization number (1948) of at least 10, using any suitable catalyst. The catalyst may be an oil-soluble salt of certain organic acids, such as the naphthenate, acetate, oleate, stearate, propionate, and butyrate salts of lithium, sodium, potassium, calcium, strontium, aluminum, barium, nickel, iron, cobalt, manganese, copper, zinc, molybdenum, vanadium, tungsten, or chromium. The catalyst may instead be the oil-soluble salt formed in situ in the wax from metal oxides such as those of vanadium, tungsten, chromium, molybdenum, manganese, iron, nickel, copper, zinc, and cobalt. The oxidation is preferably carried in the temperature range from 240° F. to 330° F. using air or oxygen as the oxidant.

On completion of the oxidation step of this process, the reaction mixture is cooled to about 150° to 200° F. The catalyst is then separated from the oxidized wax by any suitable separation technique such as decanting, filtering, centrifuging, etc. The oxidized wax is then deoiled by mixture with 1 to 20 volumes, preferably about 10 volumes, of a wax anti-solvent, such as methylethyl ketone, alone, or with a wax solvent such as toluene or other low boiling aromatics. After thorough mixing of the solvent or solvent-anti-solvent mixture with the oxidized wax product to dissolve the same, the temperature of the mixture is reduced sufficiently to bring about precipitation. When the mixture is cooled to a temperature of about —10° to +10° F., the hard oxidized wax portion precipitates out of solution. After allowing a suitable interval to insure complete precipitation and settling, the precipitate is removed by decanting, filtering, centrifuging, or the like, and is dried free of solvent. In carrying out this process, the microcrystalline wax used as the starting material may have a penetration in excess of 15. After oxidation and deoiling, as above described, the precipitated, partially oxidized, and deoiled wax has a penetration of 8 to 12.

After partial oxidation and deoiling, the hard precipitated wax product is heated to a temperature above its melting point and mixed with several times its volume of water. While thoroughly agitating this mixture, a dilute alkali solution (NaOH, KOH, NH$_4$OH, etc.) is slowly added until the mixture becomes basic as indicated by a suitable pH indicator (thus indicating the presence of a stoichiometric excess of caustic). At this point in the process the residual oxidation products, consisting mainly of acids and esters, have been saponified and are in solution in the water. The wax is then separated from the soap solution and filtered, or otherwise separated. The wax may be dried and used at this point. The wax is substantially harder than the wax obtained from the deoiling step. It is usually preferred, however, to remove substantially all of the water-soluble soaps from the wax by further washing and drying.

Following the initial removal of water-soluble soaps, the wax is washed with water and filtered several times. The wax is then slurried in acetone and filtered to remove most of the remaining entrained water. The final removal of residual water in the wax is accomplished by azeotropic distillation with benzene. The wax is dissolved in benzene and heated until the boiling point of the water-benzene azeotrope (154° F.) has been passed and the boiling point of benzene has been reached. The passing of the azeotropic boiling point indicates the time at which all of the water has been removed. Thereafter, the remaining benzene is removed by heating and stripping with nitrogen. The resulting wax product is much harder than the product precipitated at the deoiling step. This wax is harder by several units of penetration, has a penetration of 5 to 7 at 77° F., is capable of obtaining a high luster upon buffing, and is essentially free of the odor that is characteristic of ordinary oxidized waxes.

The following example specifically illustrates the process of this invention:

A sample of microcrystalline wax, having a melting point of 180° F., and a penetration of 16.7 at 77° F., was placed in a reaction kettle with a mixed catalyst consisting of 0.9 wt. percent zinc stearate and 0.1 wt. percent manganese dioxide as catalysts. The mixture was heated to 250° F. and blown with oxygen at a rate of 1.276 cubic feet per hour. Oxidation was terminated when the neutralization number (1948) of the oxidized wax reached 39. The reaction mixture was then cooled to about 150°–200° F. and the catalysts filtered therefrom. The wax was then mixed in the reaction kettle with about 10 volumes of a solvent-anti-solvent mixture, consisting of methylethyl ketone (66% by volume) and toluene (33% by volume) heated to a temperature of about 150° F. This mixture was then cooled to about −6° F. and a wax precipitated out. The solution was filtered from the precipitate, and the precipitate was dried free of solvent and recovered as a hard microcrystalline wax, having a penetration of 10 at 77° F.

The deoiled-oxidized wax thus obtained was then heated to a temperature of 210° F. with about 4 times its volume of water. This mixture was thoroughly agitated and a 5% sodium hydroxide solution was slowly added until the mixture became basic as indicated by a pH indicator paper. During this addition of caustic, the acids and esters remaining in the wax after the deoiling step were converted to water-soluble sodium soaps which remained in solution. The wax was then allowed to settle, and was filtered to remove the soap solution. Following this initial removal of water-soluble soaps, the wax product was washed with water and filtered twice. After the washing step, the wax was slurried in acetone and filtered to remove most of the remaining entrained water. The wax was then dissolved in benzene and boiled until the boiling point of the solution passed that of the water-benzene azeotrope (154° F.). The passing of the azeotrope boiling point indicated the time at which all of the water had been removed. The mixture was then heated and stripped with nitrogen to remove the remaining benzene. The wax product which was obtained had a penetration of only 6 at 77° F. This wax was capable of obtaining a high luster upon buffing and was essentially free of the odor that is characteristic of conventional oxidized waxes. This wax may be substituted for part or all of the carnauba wax in floor- and car-wax compositions.

While this process has been described with particular emphasis upon the preferred process steps described, it is to be understood that equivalent process steps may be used without departing from the intended scope of this invention. Thus, the partial oxidation step may use either oxygen or air as the oxidant, and any suitable oxidation catalyst. The deoiling of the partially oxidized wax may use any suitable solvent or solvent-antisolvent mixture. The neutralization and saponification of acids and esters in the deoiled wax may use any suitable alkali solution, at a sufficiently high temperature and with sufficient water to produce an aqueous solution of the alkali soaps formed. In the separation of the wax from the soap solution, and in the subsequent washing steps, any suitable separation technique may be used, including decanting, filtering, centrifuging, and the like. The removal of water from the product wax may be accomplished utilizing any conventional drying means, and is not necessarily limited to the particular technique described above. The wax which is produced by the saponification and complete removal of acids and esters from the partially oxidized and deoiled wax product is always substantially harder (by 2 to 4 units of penetration) than the wax obtained after the deoiling step.

What is claimed is:

1. In a method of preparing an oxidized wax of low penetration comprising partially oxidizing a microcrystalline wax, having an oil content less than 0.7% and a penetration value in excess of 15, to a neutralization number (1948) of at least 10, mixing the oxidized wax with an extracting solvent, cooling the mixture to a temperature of −10° to +10° F. to precipitate a deoiled, hard wax, and recovering the wax precipitate; the improvement which comprises mixing the recovered wax precipitate with aqueous alkali containing enough alkali to render the mixture basic and sufficient water to dissolve substantially all of the soaps formed upon reaction, at a temperature sufficient to saponify substantially all acid and esters in the wax, separating the wax from the resulting soap solution, and drying the wax to produce a hard product of very low penetration.

2. A method according to claim 1 in which the microcrystalline wax is subjected to catalytic oxidation at 240°–330° F. prior to precipitation from an extracting solvent.

3. A method according to claim 1 in which the saponification is carried out at about 210° F. and the wax is washed free of soluble soaps prior to drying.

4. A method according to claim 1 in which the saponification is carried out at about 210° F., the wax is separated from the resulting soap solution, then washed, the water separated, and the wax dried by azeotropic distillation with benzene, and the benzene removed by inert gas stripping.

5. The wax product of claim 1 which has a penetration at 77° F. of less than 10.

6. In a method of preparing an oxidized wax of low penetration comprising partially oxidizing a microcrystalline wax, having an oil content less than 0.7% and a penetration value in excess of 15, to a neutralization number (1948) of at least 10, mixing the oxidized wax with an extracting solvent, cooling the mixture to a temperature of −10° to +10° F. to precipitate a deoiled, hard wax, and recovering the wax precipitate; the improvement which comprises mixing the recovered wax precipitate with several times its volume of water, heating the mixture to about 210° F., agitating the mixture and adding a dilute sodium hydroxide solution until the mixture is basic, as indicated by a suitable pH indicator, thus saponifying substantially all acids and esters in the mixture, filtering the wax from the resulting soap solution, washing and filtering the wax product, mixing the wax with acetone to remove most of the water, removing the residual water from the wax by azeotropic distillation with benzene, stripping the benzene from the wax with nitrogen, and recovering the hard wax product.

7. A method of preparing an oxidized wax of low penetration which comprises, partially oxidizing a microcrystalline wax, having an oil content less than 0.7%, a melting point of about 180° F., and a penetration of 16.7 at 77° F., with oxygen, using a zinc stearate-manganese dioxide catalyst, until the neutralization number (1948) of the oxidized wax reaches about 39, dissolving the oxidized wax product in a mixture of methylethyl ketone and toluene, cooling the solution to about −10° to +10° F. and precipitating a wax product having a penetration of about 10 at 77° F., mixing the wax thus obtained with about 4 times its volume of water at 210° F., agitating the mixture and adding 5% aqueous sodium hydroxide until the mixture is basic, as indicated by a suitable pH indicator, thus saponifying all acids and esters in the mixture, filtering the wax from the resulting soap solution, washing and filtering the wax product, mixing the wax with acetone and filtering the same to remove most of the water, removing the residual water from the wax by azeotropic distillation with benzene, stripping the benzene from the wax with nitrogen, and recovering a hard wax product having a penetration of about 6 at 77° F.

References Cited in the file of this patent

UNITED STATES PATENTS

| | | |
|---|---|---|
| 1,864,058 | Franzen et al. | June 21, 1932 |
| 2,767,205 | Thompson | Oct. 16, 1956 |
| 2,794,040 | Annable et al. | May 28, 1957 |